United States Patent [15] 3,665,271
Assmus et al. [45] May 23, 1972

[54] DRIVING CIRCUIT FOR A TIME-KEEPING DEVICE

[72] Inventors: Friedrich Assmus, Schramber am Wurttemberg; Wolfgang Ganter, Schramber-Sulgen am Wurttemberg, both of Germany

[73] Assignee: Firma Gebruder Junghans G.m.b.H., Schrambert am Wurttemberg, Germany

[22] Filed: Sept. 8, 1970

[21] Appl. No.: 70,083

Related U.S. Application Data

[63] Continuation-in-part of Ser. No. 647,554, June 20, 1967, abandoned.

[30] Foreign Application Priority Data

June 23, 1966 Germany....................J 31 155

[52] U.S. Cl..............................318/138, 318/132
[51] Int. Cl. ..................................H02k 29/00
[58] Field of Search ..................318/254, 138, 132

[56] References Cited

UNITED STATES PATENTS

| | | | |
|---|---|---|---|
| 3,360,703 | 12/1967 | Reich | 318/132 X |
| 3,026,458 | 3/1962 | Freystedt et al. | 318/132 X |
| 3,524,118 | 8/1970 | Reich | 318/132 X |
| 3,568,017 | 3/1971 | Schaad | 318/132 |
| 3,312,883 | 4/1967 | Reich | 318/132 |
| 3,100,278 | 8/1963 | Reich | 318/138 |
| 3,156,857 | 11/1964 | Herr et al. | 318/138 |
| 3,351,833 | 11/1967 | Gerum | 318/138 |

Primary Examiner—G. R. Simmons
Attorney—Watson, Cole, Grindle & Watson

[57] ABSTRACT

A driving circuit for initiating oscillatory or rotary movement in a mechanical system wherein a control coil and driving coil are mounted in coupled relationship between opposing pole faces of a permanent magnet system and an initial driving pulse is provided to the driving coil by a transistor circuit which includes a capacitance charged through a resistance from a voltage source. The control coil generates pulses to operate the transistor circuit and provide output driving pulses to the driving coil to maintain the oscillatory or rotary movement of the system.

6 Claims, 10 Drawing Figures

INVENTORS
F. Assmus
W. Ganter
BY
Watson, Cole, Grindle & Watson
Attys.

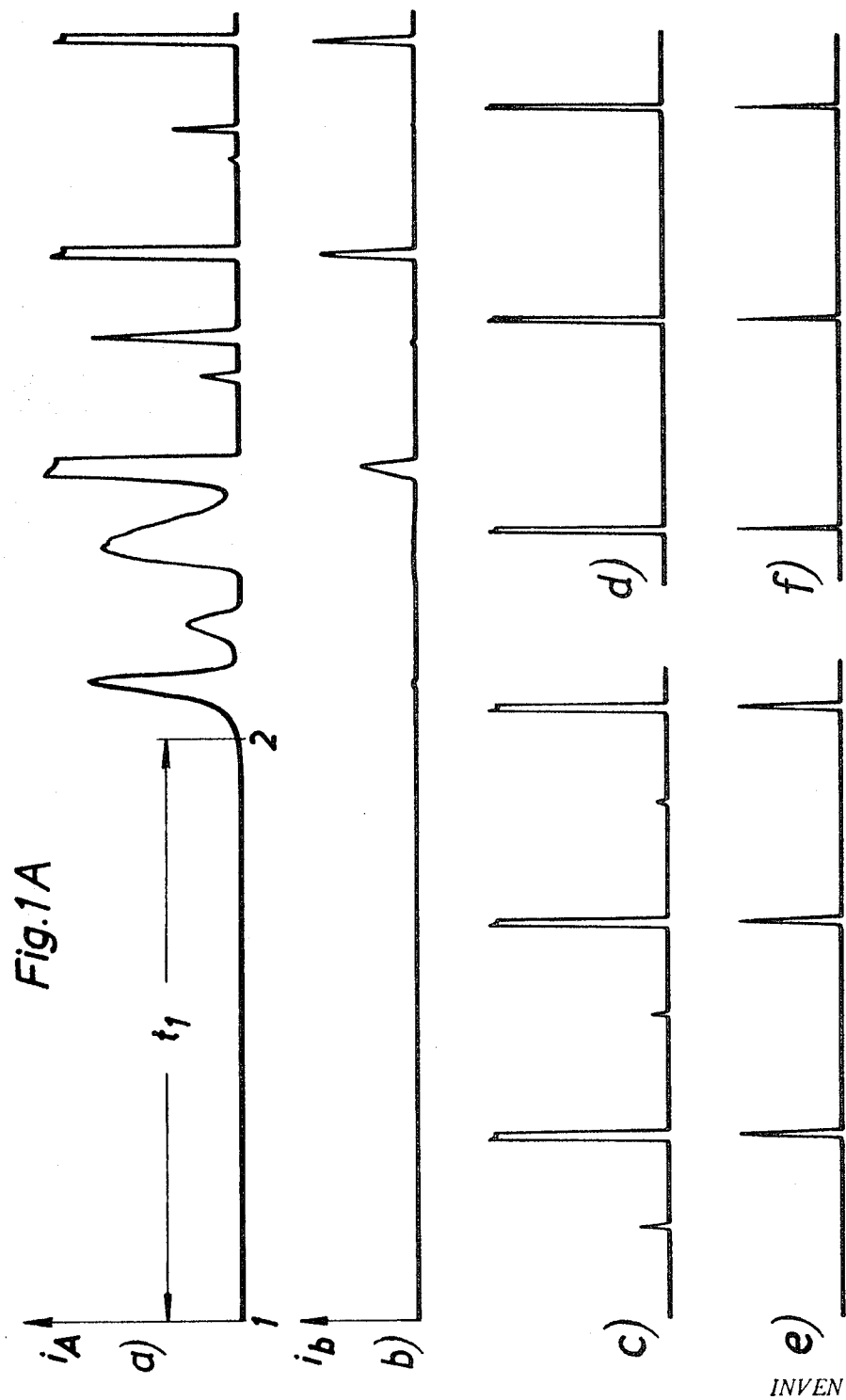

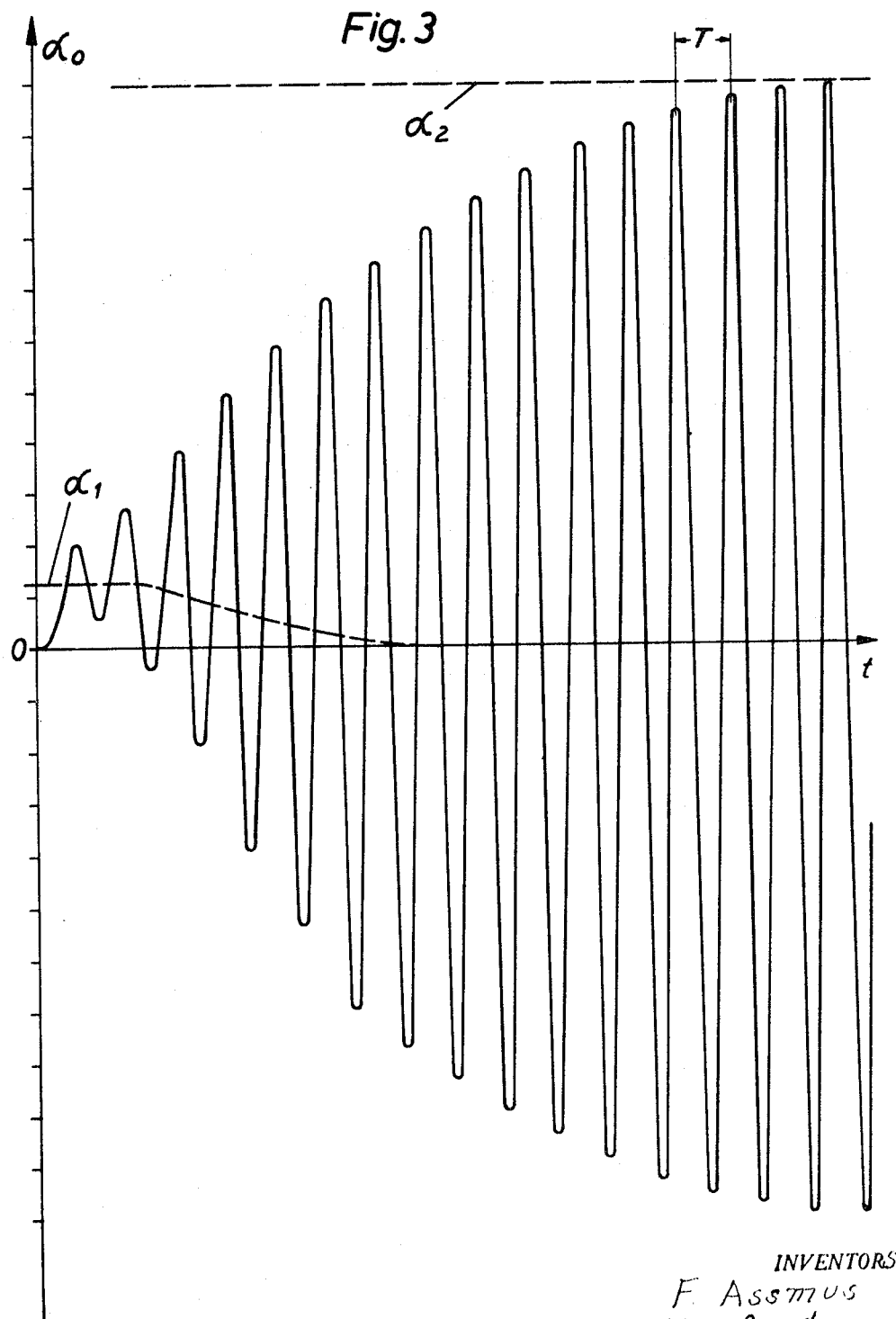

Patented May 23, 1972

INVENTORS
F. Assmus
BY W. Ganter
Watson, Cole, Grindle & Watson
Attys.

DRIVING CIRCUIT FOR A TIME-KEEPING DEVICE

This is a continuation-in-part application of our co-pending application Ser. No. 647,554, filed June 20, 1967, and now abandoned.

The invention relates to apparatus for the contactless electromagnetic drive of a rotating or oscillating mechanical system, for example the regulator of a time-keeping device, using an electronic amplifier circuit. This circuit includes a transistor with a control coil in its input circuit and a driving coil in its output circuit. Relative movement is provided between the control and drive coil and a permanent magnet arrangement, and in the rest position of the mechanical system, the coils are located in the magnetic field of the permanent magnet. A capacitance is connected in series with the control coil, as well as with a resistance located between the transistor control electrode and a voltage source. The resistance and capacitance establish an initial operation of the amplifier circuit to set the mechanical system into motion from a position of rest.

Some prior art driving circuits for time-keeping device regulators have the control and driving coils closely coupled so that the induction of the pilot pulse in the control coil initiates driving pulses for driving the regulator. Circuit elements are necessary in such systems to generate starting pulses which pulses are only provided when the system is at a standstill. After the mechanical system is caused to oscillate, the driving pulses assume control of the oscillations by the induced voltage in the control coil. The circuit elements used must be very precisely adjusted so that the starting pulses will have the correct time interval with respect to one another, so that the regulator will gradually attain an amplitude necessary for the generation of sufficient control voltages to maintain the oscillation. Further, the circuit must be designed so that the initiating pulses for system start-up do not affect the normal operation of the circuit.

Other known balance regulator driving circuits have used a bias voltage which is applied to the control electrode of a transistor via a switch, so as to energize the driving coil and deflect the balance from its rest position. Apart from the fact that a manual adjustment will have to be made in this kind of circuit in order to effect operation of the system, a synchronized operation of the switch is necessary to provide regenerative pulses to maintain the oscillator.

It is a primary object of the invention to provide a driving circuit of the type specified, which automatically generates a quicker and more positive start up of an oscillator or of a rotating system and yet is not complex.

This, according to the invention, is achieved by establishing the time constant of the RC network and the amplifying factor of the amplifying circuit so that the output current of the amplifier changes essentially in the manner of a discontinuous function whenever the bias voltage at the control electrode surpasses the input threshold value of the amplifier element. This generates a sudden driving impulse for the mechanical system which moves it fast enough for the production of sufficiently high pilot pulses to maintain its movement thereafter. In this manner, a very rapid start up is afforded. If the circuit is used for the drive of a mechanical oscillator, for example of a balance regulator, then the balance oscillator is suddenly deflected from its rest position through the driving current surge or impulse, whereupon it carries out pendulum movements about a temporary electrically displaced rest position. The deflection is large enough to produce sufficient pulses in the control coil to establish control of the transistor, so that the oscillator will be brought to its normal amplitude in a relatively short time.

In the output circuit of the amplitude circuit, an on/off switch is provided in series with the driving coil. In the case of a rotating mechanical system, the rotor is a permanent magnet and a fixed auxiliary magnet is provided which will place the rotor in a definite position in relation to the driving coil, so that the driving coil is in the magnetic field.

Further objects of the invention will be apparent from the following description when considered in connection with the accompanying drawings in which:

FIG. 1 is a graphic presentation of the average output current at the electronic amplifier circuit and of the angular position of a driven mechanical oscillator in dependence on time, whereby the control coil of the driving circuit used is made ineffective;

FIG. 1A illustrates the instantaneous current of transistor Tr of FIG. 2 which flows through the driving coil ($i_A$) and the control current, $i_b$, wherein FIG. 1A(a) represents the instantaneous output current $i_A$ of transistor Tr; FIG. 1A(b) shows the current $i_b$ in the control coil; and FIGS. 1A(c and d) represent the transistor output current as the moving elements attain their normal amplitude; and FIGS. 1A(e and f) show the control coil current for the same conditions as in FIGS. 1A(c and d);

FIG. 3 is a graphic presentation of the oscillating movement of the mechanical oscillator during start up;

Figure 2:
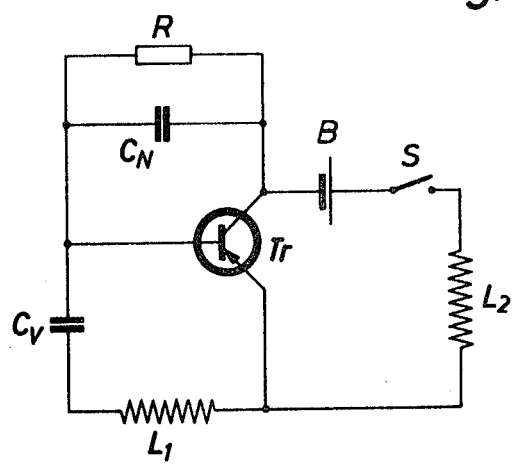
FIG. 2 is an embodiment of a driving circuit.

In FIG. 2 transistor Tr has base and emitter electrodes interconnected through a series connection of condenser $C_1$ and control coil $L_1$. In the output circuit of the transistor, between the collector and the emitter, there is provided current source B and moving coil $L_2$. Switch S turns the circuit on or off. Resistance R between the collector and the base of the transistor Tr controls the charging rate of condenser $C_1$. $C_N$ is a negative feedback condenser, which prevents continuous feedback oscillation by decoupling the control coil $L_1$ and the driving coil $L_2$.

$C_1$ and R form an RC network having a time constant which is large relative to the period of oscillation of the mechanical system. This time constant, as well as the amplification of transistor Tr, are selected so that the current flowing through the output or driving coil $L_2$ is discontinuous as soon as the voltage on the base of the transistor surpasses the input threshold value of the transistor.

Figure 4:
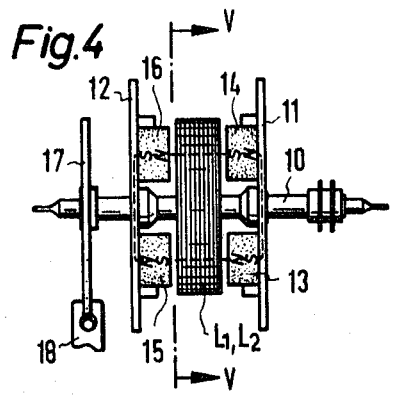
FIG. 4 is a side view showing a presentation of a balance regulator with a quadripolar magnetic system which can be driven by the circuit of FIG. 2.
Figure 5:
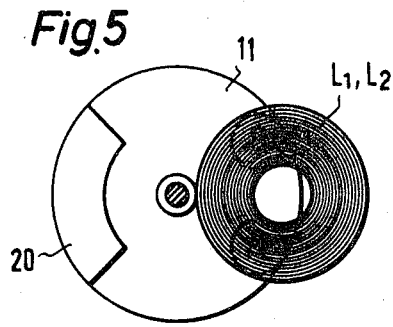
FIG. 5 is a sectional view taken on line V—V of FIG. 4 in the direction of the arrows.
Figure 6:
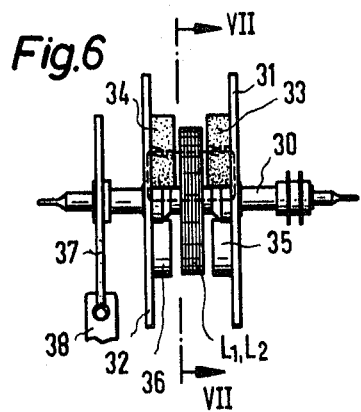
FIG. 6 is a side view of a bipolar balance which can be driven by the circuit of FIG. 2.
Figure 7:
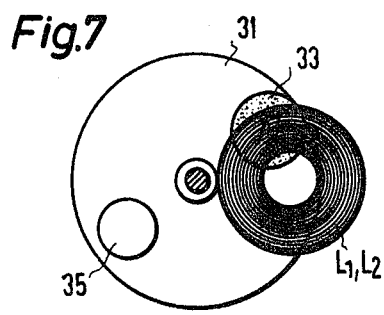
FIG. 7 is a sectional view taken on line VII—VII in the direction of the arrows.

Control coil $L_1$ and driving coil $L_2$ are coupled with the permanent magnet system which can be moved, for example, in an oscillating or a rotating manner. The permanent magnet system and the coils $L_1$ and $L_2$ are arranged in such a manner that their active coil sides are in the magnetic field of the permanent magnet arrangement when the oscillator is in the rest position, so that the current in the driving coil will interact with the magnetic flux of the permanent magnet to produce a driving pulse in a well-known manner and cause the permanent magnet to oscillate. The permanent magnet can be arranged so that two magnetic air gaps are provided in which the magnetic flux passes in opposite directions and wherein the coils are located, for example, as illustrated in FIGS. 4 and 5. However, it is also possible to use a permanent magnet arrangement with only one air gap, but the air gap, in the rest position of the oscillator, must lie asymmetrically relative to the coil axis, for example, as illustrated in FIGS. 6 and 7. However, it is possible to compensate for the non-isochronous conditions caused by such asymmetry with the application of special measures, as, for example, through voltage stabilization.

Figure 1:
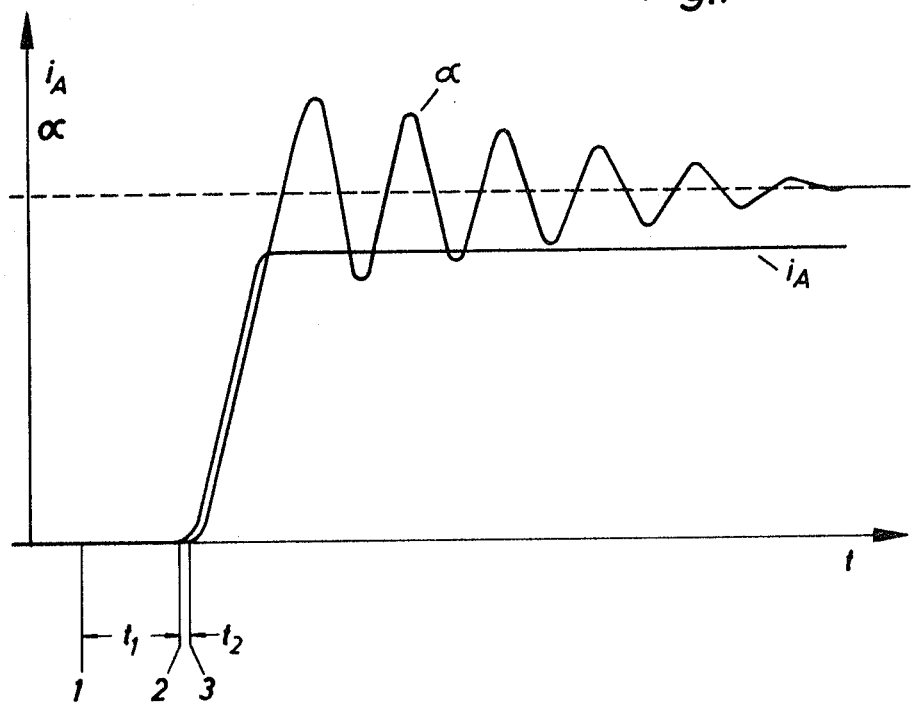

With respect to FIGS. 1 and 2, when switch S is closed the operation of the circuit is initiated (point 1 in FIG. 1). From this point in time, the bias voltage condenser $C_V$ is charged during time period $t_1$. At the point in time 2, the base-emitter-threshold voltage has been reached, an current begins to flow through the driving coil $L_2$ in the output circuit. As can be seen from FIG. 1, the output current $i_A$ proceeds, say, in the manner of a discontinuous function, for instance, a very sudden current change results. The sudden increase in current, the mechanical system, for example, a balance oscillator, is placed in motion at the point in time 3 with a phase lag $t_2$ with respect to the exciting current in driving coil $L_2$. The relatively strong driving pulse causes the oscillator to be greatly accelerated. The rest position of the oscillator is shifted because of the driving current $i_A$. This new rest position has been shown in FIG. 1 with a broken line. The oscillator swings with a dampened oscillation around this rest position until the oscillating energy has been consumed.

The oscillator deflection about its new rest position $\alpha_1$, FIG. 3, generates control pulses in control coil $L_1$, which impulses drive the transistor and synchronize output current in accordance with the beat of the control pulses. The bias voltage condenser $C_V$ is simultaneously charged by the control pulses, so that the rest position current, $\alpha_1$, of the transistor Tr decreases in the pulse intervals and finally becomes zero. The oscillation of the mechanical oscillator keeps increasing until finally the normal amplitude is reached, which, in FIG. 3, has been designed by $\alpha_2$.

It is possible to effect a change in the rest position of the oscillator by about 10° to 20°.

The invention can also be utilized for starting a rotational system, for example, a transistor motor. In such a case the motor has a permanent magnet rotor, which at a rest position is held by an auxiliary magnet in a certain position so that the coils are in the air gap between the permanent magnets. The rotor will be accelerated in the desired direction of rotation by the suddenly increasing driving current. The relatively high acceleration causes the rotor to reach a high speed when it passes the control coil so that control pulses are generated to drive the transistor. In this case, too, the start up of the motor can be achieved in the shortest time.

Naturally it is also possible to use a fixed permanent magnet system and to arrange the coils on the moved mechanical system. Permanent magnet arrangements with a suitable structure are generally known, so that it is not necessary to describe them here in detail. In such a system, the components of the circuit shown in FIG. 2 can be selected to provide driving pulses during each period of oscillation of the coils.

It is understood that the rotative and oscillatory mechanisms described herein are actuated and driven by an appropriate force created by the interaction of a current in a coil, disposed within a magnetic air gap, and the magnetic flux passing between opposing magnetic pole faces.

By the switching arrangement according to the invention, it is possible, for example, to drive a quadripolar balance, as shown in FIGS. 4 and 5. In this case, 10 designates the balance shaft, on which are arranged two disks 11 and 12 consisting of magnetic material. These disks 11 and 12 each carry four permanent magnets 13, 14 and 15, 16, which are magnetized in the direction of the balance shaft 10 and which form two magnetic air gaps, which encompass or receive the active sides of the coils $L_1$ and $L_2$. Numeral 20 designates the counterweights on the disks 11 and 12. 17 is the balance spiral spring which has been attached at 18. The mechanism illustrated in FIGS. 4 and 5 oscillates because of the interaction between spiral spring 17 and the force imposed on the balance shaft due to the aforementioned interaction between the electrical current in driving coil $L_2$ and the magnetic flux which passes between opposing pole faces 14, 16 and 13, 15. The force generated by the interaction of the current and the magnetic flux is opposed by a tension force created by spring 17, which spring force rotates balance shaft 10 in an opposite direction to the driving force. An oscillatory motion of balance shaft 10 is obtained by successive repetitive energization of driving coil $L_2$ by means of the driving circuit disclosed in FIG. 2. Further, spring 17 positions the coils $L_1$, $L_2$ in the air gap between the opposing pole faces as indicated in FIG. 5 when the balance mechanism is at rest.

Instead of a quadripolar balance, one can also use a bipolar balance according to FIGS. 6 and 7. In this case, 30 designates the balance shaft, which carries two magnetic disks 31 and 32 on which two permanent magnets 33 and 34, magnetized in the direction of the balance shaft 30, have been arranged. 37 designates the balance spiral, which has been attached at point 38. The rest position of the balance has been chosen in such a manner that one side of the coils $L_1$ and $L_2$ is located asymmetrically in the air gap formed by the permanent magnets 33 and 34, whenever the balance is in its rest position. Balance shaft 30 is caused to oscillate in a manner similar to that which has been described above in reference to the apparatus shown in FIGS. 4 and 5.

One of the primary advantages of the invention disclosed herein, is that the balance mechanisms as disclosed in FIGS. 4–7 are initially actuated from a rest position solely by virtue of the current which is induced in the driving coil $L_2$ by means of the closure of switch S (FIG. 2), which causes capacitor $C_1$ to charge whereupon transistor $T_r$ conducts to provide driving pulse through driving coil $L_2$. The spiral springs 18 and 38, in FIGS. 4 and 6, respectively, serve to position the respective balance shafts 10, 30 so that control coil $L_1$ and driving coil $L_2$ are positioned in the magnetic air gap between opposing magnetic pole faces. With the elements positioned as shown in FIGS. 5 and 7, the presence of an impulse of current in driving coil $L_2$ will generate a force on the disk structure comprising 11, 12 and 31, 32 (FIGS. 4 and 6, respectively) to rotate balance shafts 10, 30 in a direction determined by the direction of current flow in driving coil $L_2$ and the direction of magnetic flux between the opposing pole faces, in accordance with well-known principles.

Figure 8:
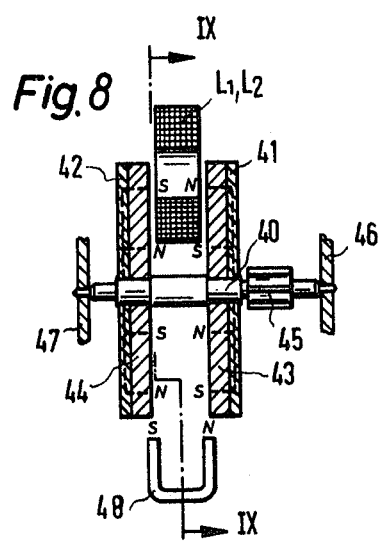
FIG. 8 is a sectional view of a motor driven by the circuit according to the invention taken on line VIII—VIII of FIG. 9 in the direction of the arrows.
Figure 9:
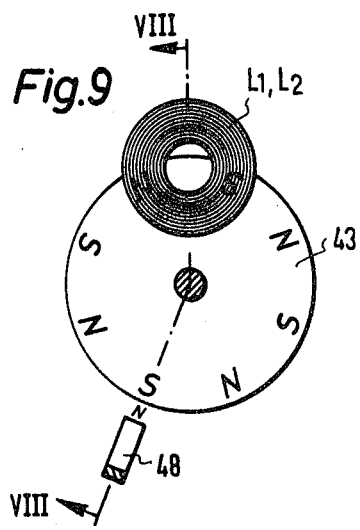
FIG. 9 is a sectional view taken on line IX—IX of FIG. 8 in the direction of the arrows.

With the circuit according to the invention, it will also be possible to drive a motor, as shown in FIGS. 8 and 9. Rotor shaft 40 is mounted in bearing plates 46 and 47. 45 is a pinion or driver arranged on the rotor shaft.

The rotor shaft 40 carries two magnetic disks 41 and 42, on which two disk-shaped permanent magnets 43 and 44 have been arranged. These permanent magnets are actually magnetized in such a manner that they will form, on their periphery, several magnetic poles pointing in the direction of the rotor shaft 40, with opposing pole faces as illustrated in FIG. 8. The coils $L_1$, $L_2$ project into the air gap formed by the magnets 43 and 44. The distance between the magnetic poles or the size of the coil is selected in such a manner that the mean distance of the coil sides corresponds to the distance of two adjacent poles.

In the embodiment illustrated in FIGS. 8 and 9, motor shaft 40 is caused to rotate by the successive interaction of the current in driving coil $L_2$ with successive respective opposing magnetic pole faces by suitably timing the energization of driving coil $L_2$ with impulses from the driving circuit, for example, as disclosed in FIG. 2. This is accomplished by the feedback current induced in control coil $L_1$, which periodically causes transistor $T_r$ to conduct and provide current impulses to driving coil $L_2$ so that a constant rotative force is applied to motor shaft 40.

In order to initiate motion from a rest position, coils $L_1$, $L_2$ are positioned in the flux field of fixed permanent magnet 48 which aligns the coils as shown in FIG. 9 in detail.

What is claimed is:

1. A drive circuit for rotating a mechanical system, comprising;

spaced permanent magnets each having poles of opposite polarity in opposed relationship and forming an air gap therebetween, a coreless driving coil and a coreless control coil mounted in coupled relationship and positioned in said air gap to intersect the magnetic flux passing between said magnetic poles with said mechanical system at rest, an amplifier having an input and output circuit, said input circuit includes a capacitance, said control coil is electrically connected in series with said capacitance for controlling said amplifier in response to signals generated by said mechanical system, a resistance connecting a control electrode of said amplifier to a voltage source, said driving coil is electrically connected in said output circuit, said amplifier including means to prevent feedback oscillations, and said amplifier, said capacitance, and said resistance generating an impulse output current from said amplifier to initiate rotation of said mechanical system from a position of rest.

2. A circuit as in claim 1 wherein said means for initiating rotation includes a switch whereby said capacitance is charged upon activation of said switch to initiate operation of said amplifier.

3. A circuit as in claim 2 further comprising means for positioning said control coil and said driving coil in said air gap to intersect the magnetic flux passing between said magnetic poles when said mechanical system is at rest.

4. A circuit as in claim 3 wherein said permanent magnet comprises two bi-polar magnetic pieces and wherein said means for positioning locate said control coil and said driving coil in an off-center relationship with respect to said magnetic pole pieces when said mechanical system is at rest.

5. A circuit as in claim 3 wherein said amplifier generates impulses to said driving coil intermittently and wherein said mechanical system is caused to oscillate by an interaction between said means for positioning and said driving impulses.

6. A circuit as in claim 1 wherein said permanent magnet system is in the form of a rotor and said amplifier provides driving impulses to continuously rotate said rotor.

* * * * *